March 23, 1926.                    1,578,128
J. E. JACOBSON
WEEDER
Filed Sept. 18, 1925

Inventor.
John. E. Jacobson.

Attorney.

Patented Mar. 23, 1926.

1,578,128

UNITED STATES PATENT OFFICE

JOHN E. JACOBSON, OF OLYMPIA, WASHINGTON.

WEEDER.

Application filed September 18, 1925. Serial No. 57,221.

*To all whom it may concern:*

Be it known that I, JOHN E. JACOBSON, a citizen of the United States, residing at Olympia, in the county of Thurston and State of Washington, have invented a new and useful Improvement in Weeders, of which the following is a full, clear, and exact description, such as will enable others skilled in the art to which it appertains to make and use the same.

My invention relates to weeders, and has for its primary object the provision of a weeder in which the weeding blade may be renewed whenever desired.

A further object of my invention, is the provision of a weeder which can also be used for the operation of thinning and which is of simple construction and comparatively easy of manufacture.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1:
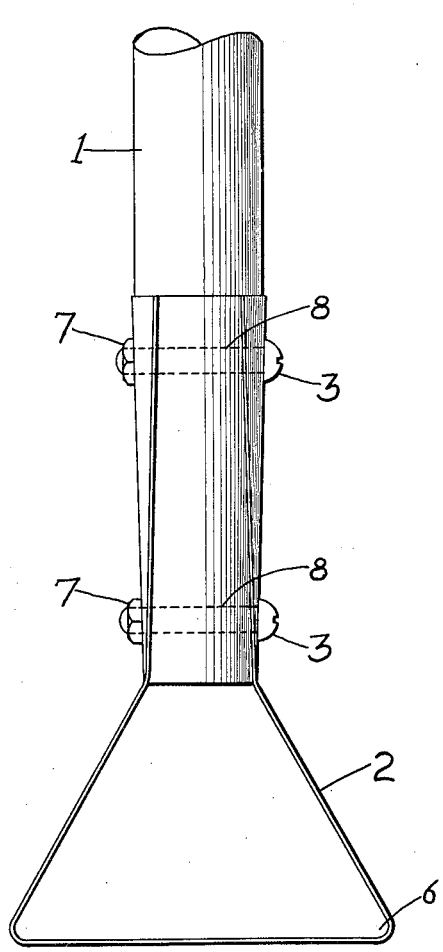
Figure 1, is a plan view of the preferred embodiment of the present invention.
Figure 2:
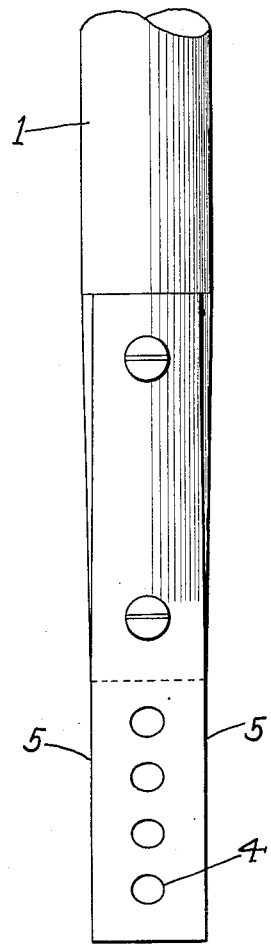
Figure 2, is a side view.
Figure 3:
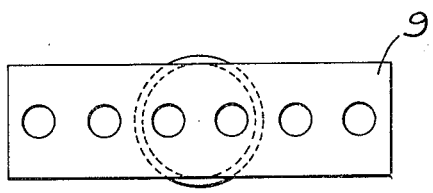
Figure 3, is an end view.

Referring to the drawings in detail, the weeder is provided with a handle 1, which is constructed preferably of bamboo or some similar material. Attached to the handle at one end thereof by means of bolts 3 is the weeding blade 2. The blade 2 has apertures 4 formed therein in order to lessen the weight thereof. The blade 2 is of the same width throughout and both edges 5 thereof are shapened in order to assist in the penetration of the soil.

By making both edges of the blade sharp the weeder will tend to clean itself and thereby prevent the premature rusting thereof. The apertures in the blade allow the soil to percolate therethrough, thereby reducing friction and facilitating the use of the weeder.

As will be noted from the drawings, the blade is bent to triangular shape having substantially sharp corners 6. The bolts 3 pass through apertures provided in the ends of the blade which are secured to the handle 1. The bolts are secured by the nuts 7. Two or more apertures 8 are provided in the handle 1 for the reception of the bolts 3.

It will be noted that the edges of the blade are absolutely straight, so that clay will not impede the operator when using my device either as a weeder or a thinning device. In addition due to the bolt connection with the handle the user can easily replace the blade when worn out.

It is believed that the advantages and operation of a tool of this character will be readily appreciated and although I have herein shown and described the preferred embodiment of the present invention, it is nevertheless to be understood that minor changes may be made therein without however departing from the spirit and scope of the following claim.

I claim:

A weeder comprising a handle of circular cross section, a blade of uniform width and of thin bendable steel provided with spaced apertures throughout its length and having both edges thereof sharpened, said blade being bent into the shape of a triangle and having two free ends at one of the angles of said triangle which partially embrace said handle and are releasably secured thereto by means of bolts and nuts.

JOHN E. JACOBSON.